United States Patent [19]

Fujii et al.

[11] 4,444,488

[45] Apr. 24, 1984

[54] ADJUSTABLE MIRROR SUPPORT FOR COPYING APPARATUS

[75] Inventors: Yozo Fujii; Kazuo Murakami; Hirofumi Sakaguchi, all of Hachioji, Japan

[73] Assignee: Konishiroku Photo Industry Co., Ltd., Tokyo, Japan

[21] Appl. No.: 337,321

[22] Filed: Jan. 5, 1982

[30] Foreign Application Priority Data

Feb. 3, 1981 [JP] Japan .................................. 56-15318

[51] Int. Cl.³ ........................................... G03G 15/00
[52] U.S. Cl. ......................................... 355/11; 355/8; 355/66
[58] Field of Search .................. 355/11, 8, 49, 51, 57, 355/60, 65, 66

[56] References Cited

U.S. PATENT DOCUMENTS

| | | | |
|---|---|---|---|
| 4,118,117 | 10/1978 | Koizumi et al. | 355/11 X |
| 4,141,545 | 2/1979 | Schnall et al. | 355/8 X |
| 4,170,412 | 10/1979 | Grace et al. | 355/11 X |
| 4,183,656 | 1/1980 | Ishihara et al. | 355/8 |
| 4,330,196 | 5/1982 | Yamaguchi | 355/8 |

Primary Examiner—R. L. Moses
Attorney, Agent, or Firm—Jordan Bierman; Linda Bierman; C. Cornell Remsen, Jr.

[57] ABSTRACT

In the optical system of an electrophotographic copying apparatus embodying movable mirrors, it is of the utmost importance that these mirrors be properly aligned relatively to one another. In the present invention, two of the mirrors mounted at right angles to one another on a slidable frame which moves at half the speed of another movable mirror, are mounted on that frame for slight pivotal movement. This pivotal movement is controllable to provide adjustment of errors in the optical system and when adjustment is completed the mirrors are fixed in place.

2 Claims, 5 Drawing Figures

ADJUSTABLE MIRROR SUPPORT FOR COPYING APPARATUS

BACKGROUND OF THE INVENTION

1. Field of the Invention

The present invention relates to an exposure device, and more particularly to the exposure device that is used for the optical system with a movable mirror to be used in the copying apparatus etc.

2. Description of the Prior Art

Generally, in copying apparatus such as an electrophotographic copying apparatus, an image recording is made in such a manner that the light from a light source is irradiated the surface of an original placed on an original glass plate, and the reflected light therefrom is led to the surface of a charge-retaining member such as a photosensitive substance through the reflection made by the optical system composed of a mirror etc., and thus an electrostatic latent image is formed on the surface of said charge-retaining member. As an aforesaid image recording method, there have generally been known a system wherein the original glass is stationary and the optical system is movable, and alternately a system wherein the optical system is stationary and the original glass plate is movable.

The present invention relates to an exposure device wherein the image recording is effected by the former movable optical system, and the image recording system of said system will be explained, referring to the drawings.

FIG. 1 is a schematic view of a well-known exposure device wherein the optical system moves. In the FIG. 1, the numeral 1 is an original placed on a transparent glass 2 of the original glass plate with its imaging surface downward and irradiated by the illumination lamp 3, the reflected light from said imaging surface forms the light image on the surface of the photosensitive member 9 through the movable mirrors 4, 5 and 6, a fixed mirror 7 and a lens 8 for image formation.

Next, operation of the optical system thus composed will be explained. First, after an illumination lamp 3 is lit, the first mirror 4 that is arranged so that it can move together with said illumination lamp 3 travels in the direction of an arrow at a speed V in parallel with the original. Simultaneously with this travel of the first mirror 4, the second mirror 5 and the third mirror 6 also travel at a speed of ½ V in the same direction (the direction of an arrow) in parallel with the original.

Thus, the entire surface of the original is optically scanned and total reflected light from the image area of said original is led onto the surface of the photosensitive member 9 as mentioned above and concurrently with this, the surface of the photosensitive member 9 also rotates at the same speed V as for said first mirror 4, therefore, a said reflected light is image-wise projected onto the surface of the photosensitive member 9 same as an image of the original, and an electrostatic latent image is precisely formed on the surface of the photosensitive member 9.

In the movable optical system as described above, the second mirror 5 and the third mirror 6 move at a half the speed of the first mirror 4 and therefore, said second mirror 5 and third mirror 6 are mounted on a frame in one body and usually move along a guide rail provided on a driving side of said frame being pulled by a wire.

SUMMARY OF THE INVENTION

The present invention relates to the optical system described above and, as will be apparent from the above explanation, the adjustment of many mirrors and lense which form the optical system is not easy. As shown in FIG. 2, for example, when the first mirror 4 is set with its this side in the figure at the position of 4' shown with the dotted line, the light reflected at the rear side of the first mirror 4 advances along the line in the direction of the arrow and forms an image-wise at the I portion on the surface of the photosensitive member 9, however, the light reflected at this side 4' of the first mirror 4 advances along the dotted line and forms an image-wise at the I' portion on the surface of said photosensitive member 9, which causes the light image that should originally be rectangular to be out of focus and further causes the light image to be in a distorted form. Improper mounting and adjustment of these mirrors, on the other hand, cause the light image to be out of focus and to be distorted. In the optical system wherein a slit exposure is made, the mirror needs to be parallel with the longitudinal direction of the slit, namely, with the drum shaft of the photosensitive member 9. An adjustment of mirror position that pushes the mirror itself with small screws has a limit in its adjustment and when the mirror is greatly pressed and deformed, the flatness of the reflecting surface deteriorates, and it adversely affects the sharpness of the light image. Further, in an optical system comprising plural mirrors, the adjustment is difficult due to the mutual effect of mirrors and it is a work that requires skill.

It is an object of present invention to provide that the accuracy for machining of parts of the machine is counted on and the adjustment can be made simply, clearly and efficiently.

The above object is accomplished by an exposure device for a copying apparatus comprising a member for rotatably fixing the central portion of a mirror carriage for attachment to the mirror, and a member for moving the end of said mirror carriage formed of a said central portion at the fulcrum and adjusting an angle of the mirror of said mirror carriage.

DETAILED DESCRIPTION OF THE PREFERRED EMBODIMENTS

Figure 1:
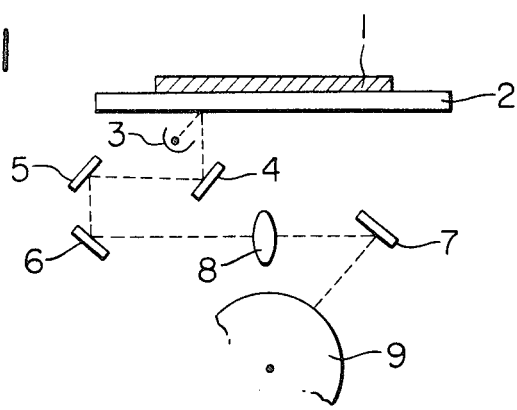
FIG. 1 is a schematic view of a known exposure device wherein the optical system moves.
Figure 2:
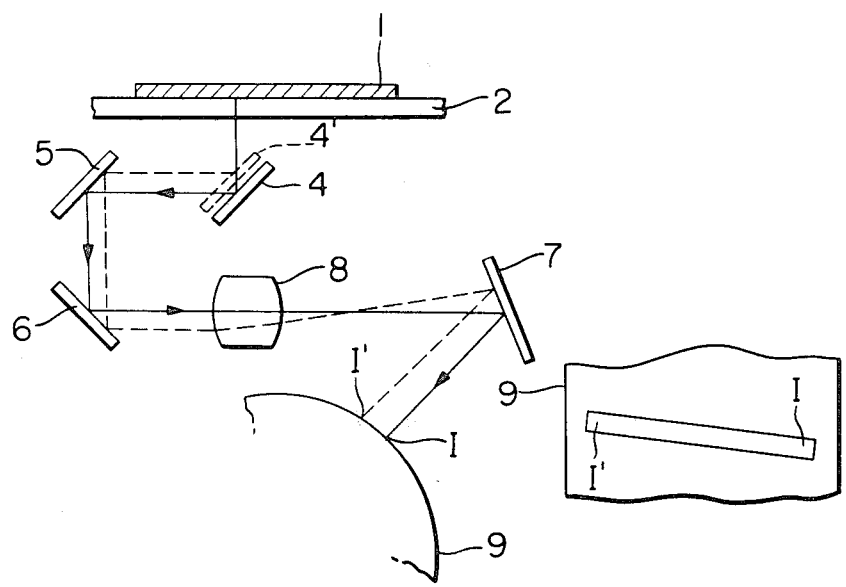
FIG. 2 is a view of the light path corresponding to a deviated angle position of the mirror in the optical system of FIG. 1.
Figure 3:
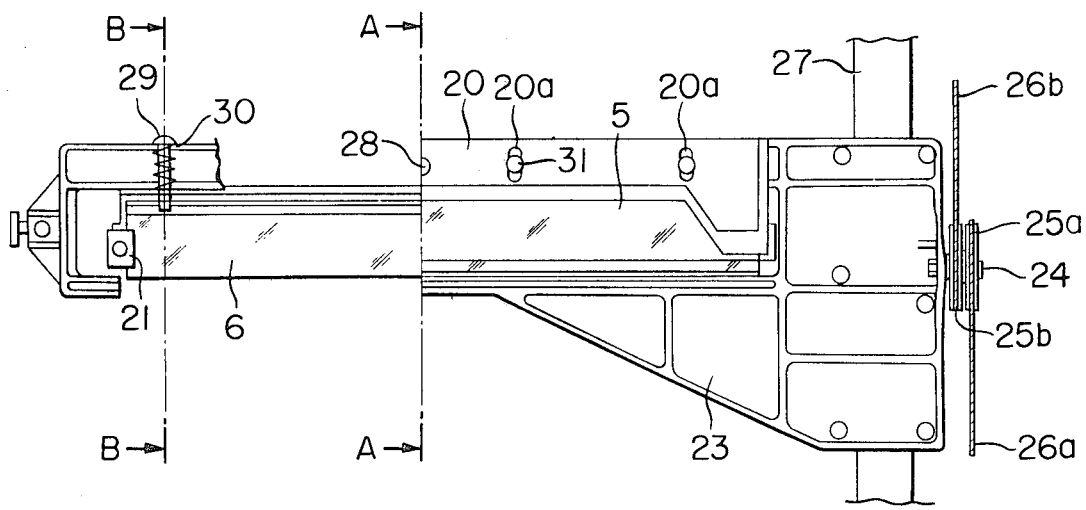
FIG. 3 shows an example of the present invention and is a top view wherein a mirror supporting member 20 is fixed to a frame 23 and, FIG. 4 and FIG. 5 represent a sectional view of A—A and a sectional view of B—B of FIG. 3 respectively.

Numeral 23 is a frame made of aluminum or iron, and it slides on a guide rail 27 that is fixed to the copying apparatus. On the end face of the frame 23, a shaft 24 is fixed. On the shaft 24, pulleys 25a and 25b are journaled and on the circumferential surfaces of said pulleys 25a and 25b, wires 26a and 26b are arranged with tension so that they wind round the pulleys and when either one of the wires is pulled in one direction, the frame 23 moves on the guide rail in the corresponding direction.

The second mirror 5 and the third mirror 6 are fixed to the mirror supporting member 20 through the mirror pad 22 made of an elastic material such as a rubber with the aid of the mirror holder 21 in a position wherein they face each other at an angle of 90°. The mirror supporting member 20 should preferably be a casting whose material is an aluminum or an iron and is fully annealed to prevent deformation. The surfaces to which the second mirror 5 and the third mirror 6 are attached respectively are machined so that the angle of 90° will be precisely assured by the milling machining. Precision casting will naturally eliminate the machining.

Figure 4:
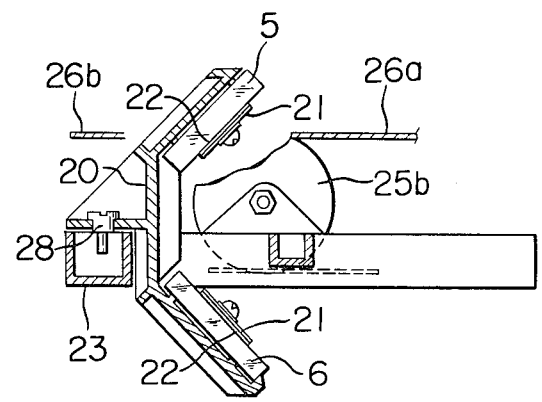

As shown in FIG. 4, the mirror supporting member 20 is attached to a frame 23 with the aid of pivot screw 28 at the central portion of the mirror. The mirror supporting frame 20 is rotatably adjusted and fixed about the center of the pivot screw 28, and therefore it has elongated holes 20(a) for adjustment thereon at the position where the mirror is fixed by other screws 31.

Figure 5:
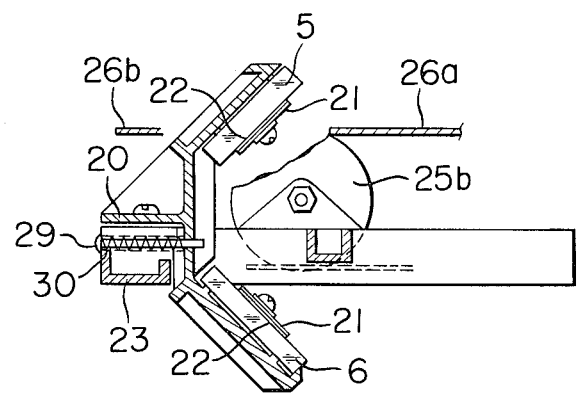

At the edge portion of the mirror, an adjusting screw 29 for the rotatable adjustment is provided. The mirror supporting member 20 and the frame 23 are interconnected by the adjusting screw 29 and owing to the compression coil spring 30 arranged around the adjusting screw 29, the frame 23 gives to the mirror supporting member 20 a force that constantly pushes the mirror supporting member 20 to the right side as shown in FIG. 5. Owing to such construction, it is possible to make a fine adjustment of the angle of the mirrors against the Frame 23 about pivot screw 28 by tightening or loosening the adjusting screw 29, whereby the mirror supporting member 20 is adjusted and fixed against the frame 23. When the proper angle position is obtained, other fixing screws 31 should be tightened and fixed.

Owing to such construction, there has been produced the effect that an attaching and adjusting process for the mirror that is originally complicated can be done simply and the time required for assembly and adjustment can remarkably be reduced by adjusting the length of optical path with the light image in the central portion of the mirror and by making the fine adjustment on the deviation angle of the mirror. Further, in the present invention, if the second mirror 5 and the third mirror 6 are located to face each other with an angle of 90°, it is possible to prevent the fuzzy light image and distortion by simply adjusting said second and third mirrors.

What is claimed is:

1. In an electrophotographic copying apparatus of the type in which the illuminated image of an original placed on a transparent glass is directed toward a photosensitive member by an optical system which includes a first movable mirror, and second and third movable mirrors travelling at half the speed of the first movable mirror, the improvement comprising a slidable frame, a support, means mounting said second and third mirrors on said support in spatial relationship one with the other, facing one another at a 90° angle, means pivotally mounting said support on said frame for adjustably positioning said second and third mirrors relative to said first mirror and other elements of the optical systems, and means holding said mirror support in the desired adjusted position.

2. An electrophotographic copying apparatus according to claim 1, in which the means pivotally mounting said support for adjustably positioning said second and third mirrors includes a spring-loaded adjusting screw extending from said frame to said support.

* * * * *